Patented Jan. 28, 1941

2,230,127

UNITED STATES PATENT OFFICE 2,230,127

PROCESS FOR THE MANUFACTURE OF PLASTIC COMPOSITIONS

Hermann Basler, Berlin, Germany

No Drawing. Application February 11, 1937, Serial No. 125,265. In Germany April 20, 1935

2 Claims. (Cl. 18—55)

This invention relates to improvements in methods or processes for manufacturing metal impregnated fibrous materials, in the class of plastics, for the production of boards and molded shapes.

Several processes are known for mixing synthetic resins with other materials to provide a product having desired characteristics and in which the constituents are substantially inseparable. Such products are often made in the form of raw stock as sheets, rods, tubes, etc., for future working or molding into finished forms or articles, and, depending upon the nature of the use of the finished articles, the raw stock is made up of a wide variety of materials intermixed or blended with the resinous base or body.

For example; if the product is to have the characteristic of heat conductivity such material as malleable iron cuttings, powdered metals, metal kernels, aluminum wool or cuttings or other forms of metals such as wire and wire nettings are employed. If the product is to be used for friction devices friction producing materials are added. Also fillers such as asbestos fiber or other woven or unwoven fibrous materials are generally employed to reduce the amount of synthetic resin used and thereby cheapen the cost of the product.

In the known processes the synthetic resins are first thinned with alcohol or other suitable solvent to permit the admixture of foreign materials. For instance, in the manufacture of brake linings, woven or unwoven fibrous materials are saturated with the thinned resin solution and then pressed in the usual manner with the addition of malleable iron cuttings or the like for producing the desired friction.

These processes have several disadvantages. For example, to obtain a more concentrated and uniform mixture with metal wool, such as aluminum wool, it is necessary that the synthetic resin be thinned to a fluid consistency of relatively low viscosity with alcohol, or other solvent of synthetic resin, as a fluid medium. Such a mixture, which must be fluid enough to permit dissemination of the foreign materials, is expensive to use due to evaporation losses of the solvent and to minimize such losses special apparatus must be provided for recovering as much as possible of the evaporated solvent.

Furthermore, inorganic fibrous materials, such as asbestos cement fibers used in the present day practice, have low absorption and adhesion factors for synthetic resins so that it is necessary that such fibrous materials be worked into the synthetic resins while the same are in a highly concentrated nearly plastic state; with the result that long and tedious working or kneading processes must be resorted to if a substantially uniform product is to be obtained.

The main objects of my invention are to overcome the difficulties of the present day practice by means of an improved method of mixing synthetic resins with foreign materials; to provide an improved method or process by which molded fibrous metal impregnated products may be manufactured at a greatly reduced cost, and to provide an improved plastic composition.

In my improved process organic fibers are used in place of inorganic fibers, the organic fibers being first prepared by mechanical and chemical treatment in any of several well-known manners to open-up or separate the fibers and to remove undesirable matter from the raw fibrous materials. Such organic fibers with respect to their natural absorption factor are more readily able to absorb fluid synthetic resins.

In my improved process a synthetic resin emulsion is first prepared by thinning or dissolving the synthetic resin with Natron or other suitable solvent and then emulsifying the solution in water whereby an emulsion having a high percentage of synthetic resin is obtained. After the emulsion has been prepared the organic fibrous material is added and thoroughly stirred to produce a fluid mush-like mixture; for example, such a mixture that would be obtained by using approximately 3% of fiber and 97% of emulsion. To this mixture it is now possible to add metal wool, such as aluminum wool, or any other suitable form of comminuted metal, and to uniformly distribute or disseminate the same throughout the mixture by a simple stirring operation. In preparing this mixture I have found that an organic fiber content of as much as 7% can be practically employed.

The resultant mixture can then be readily cast into molds or worked into shapes of any description in the usual manner. However, in my improved process the resultant mixture is first preformed into a suitable shape for handling as raw stock for future working into finished products. During the preforming operation the water is removed from the mixture in any suitable manner such as by evaporation and the material is allowed to dry. In this form the raw or stock material thus produced may be readily handled, stored, or shipped, and whenever it is desired, may be further processed into finished products by the usual hot press methods employed with synthetic or thermosetting plastics.

The term "comminuted" as herein used is intended to generically include metal powder, particles, kerns, cuttings, filaments, metal wool, mineral wool, etc.

Although but one specific procedure for practicing this invention is herein described, it will be understood that details of such procedure may be altered or omitted without departing from the spirit of this invention as defined by the following claims.

I claim:

1. A method of manufacturing heat conducting thermo-plastic bodies consisting in subjecting organic fibres to a combined mechanical and chemical decomposing treatment, removing foreign matter from said decomposed fibres, incorporating said fibres into a comparatively thin emulsion of a synthetic resin, stirring the mixture into a mush-like consistency, stirring aluminum wool uniformly into said mixture shaping the body from said mixture and drying the same.

2. A method of manufacturing heat conducting thermo-plastic bodies consisting in subjecting organic fibres to a combined mechanical and chemical decomposing treatment, removing foreign matter from said decomposed fibres, incorporating said fibres into a comparatively thin emulsion of synthetic resin to provide a mixture having approximately 3 to 7% of fibre content, stirring the mixture into a mush-like consistency, stirring aluminum wool uniformly into said mixture, shaping the body therefrom and drying the same.

HERMANN BASLER.